United States Patent [19]
North

[11] Patent Number: 5,684,564
[45] Date of Patent: Nov. 4, 1997

[54] FILM HANDLING APPARATUS FOR A MULTIPASS PHOTOGRAPHIC FILM SCANNER AND PRINTER

[75] Inventor: Stephen Palmer North, Rochester, N.Y.

[73] Assignee: Eastman Kodak Company, Rochester, N.Y.

[21] Appl. No.: 620,428

[22] Filed: Mar. 22, 1996

[51] Int. Cl.⁶ .................................................. G03B 27/62
[52] U.S. Cl. ..................... 355/40; 355/75; 242/535.1; 396/567; 396/569
[58] Field of Search .................................. 396/639, 646, 396/647, 648; 355/47, 38, 68, 40, 41, 75; 346/567; 226/91, 92, 162; 242/535.1, 535.2, 353.3, 538.1, 538.2, 538.3

[56] References Cited

U.S. PATENT DOCUMENTS

| | | | |
|---|---|---|---|
| 4,012,004 | 3/1977 | Tonellato | 242/55.19 |
| 4,627,719 | 12/1986 | Nitsch et al. | 355/41 |
| 4,769,681 | 9/1988 | Takagi | 355/72 |
| 5,313,249 | 5/1994 | Hochreiter et al. | 355/47 |

*Primary Examiner*—D. Rutledge
*Attorney, Agent, or Firm*—Francis H. Boos, Jr.

[57] ABSTRACT

Film handling apparatus for a multipass scanner and printer system has film receiving chambers at opposite ends of the apparatus above the film track to receive and temporarily store the coiled film between forward and reverse film transport phases. Film diversion spring fingers are provided at least at the film entry end of the film track between the track and bottom opening to the chamber to allow insertion of the film in one direction and diversion of the film into the chamber when the film transport direction is reversed.

4 Claims, 4 Drawing Sheets

FILM HANDLING APPARATUS FOR A MULTIPASS PHOTOGRAPHIC FILM SCANNER AND PRINTER

FIELD OF THE INVENTION

The invention relates generally to the field of photographic film printer systems and, in particular to apparatus capable of automatically transporting film in both directions past scanner and printer stations of such systems

BACKGROUND OF THE INVENTION

In U.S. Pat. No. 4,627,719, there is shown a multipass film handling apparatus for photographic film printing system which employs film receiving chambers at opposite ends of the apparatus. Film initially fed into a film track at one side engages drive rollers and is transported past a combined scanner/printer station. During this first pass, a film scanning operation is performed after which the film is gradually accumulated in coiled form within a cylindrical receiving chamber provided at the far end of the transport apparatus. When the entire strip of film is scanned, the transport drive reverses and transports the film past the station a second time during which the film printing operation is performed. The film is now gradually accumulated in a cylindrical chamber at the near end of the transport apparatus. The near side chamber is open at the top to facilitate manual removal of the coiled film strip when printing is completed.

The receiving chambers in this apparatus are oversized and are located below the film track thereby facilitating the easy entry and coiling of the film at the end of each pass. In some applications, restricted space availability requires that the receiving chambers be located above the film track. Additionally, there is a need to provide some arrangement to allow the film to pass freely beneath the entrance side receiving chamber during film insertion while also providing for diversion of the film into the entrance side chamber during the second pass of the film.

SUMMARY OF THE INVENTION

In accordance with the invention, therefore, there is provided film handling apparatus for a multipass photographic film scanner and printer system in which film is transported in forward and reverse directions during separate scanning and printing operations, wherein the apparatus comprises a film track for guiding an elongated strip of film along a film transport path past one or more film exposure stations for said scanning and printing operations, the film track having an entry port for insertion of the film into the track in a forward direction; and drive means for transporting the film in forward and reverse directions along the film track. The apparatus also includes a first film receiving chamber mounted above the track at the film entry port, the chamber having an opening in communication with the track for receiving and coiling the film for temporary storage therein; and film diversion means extending into the film transport path to engage an end of the film for diverting the film away from the entry port and into the chamber opening when the film is transported in the reverse direction, the diversion means being movable out of the film transport path to allow insertion of the film into the track in the forward direction.

DETAILED DESCRIPTION OF THE INVENTION

Figure 1:
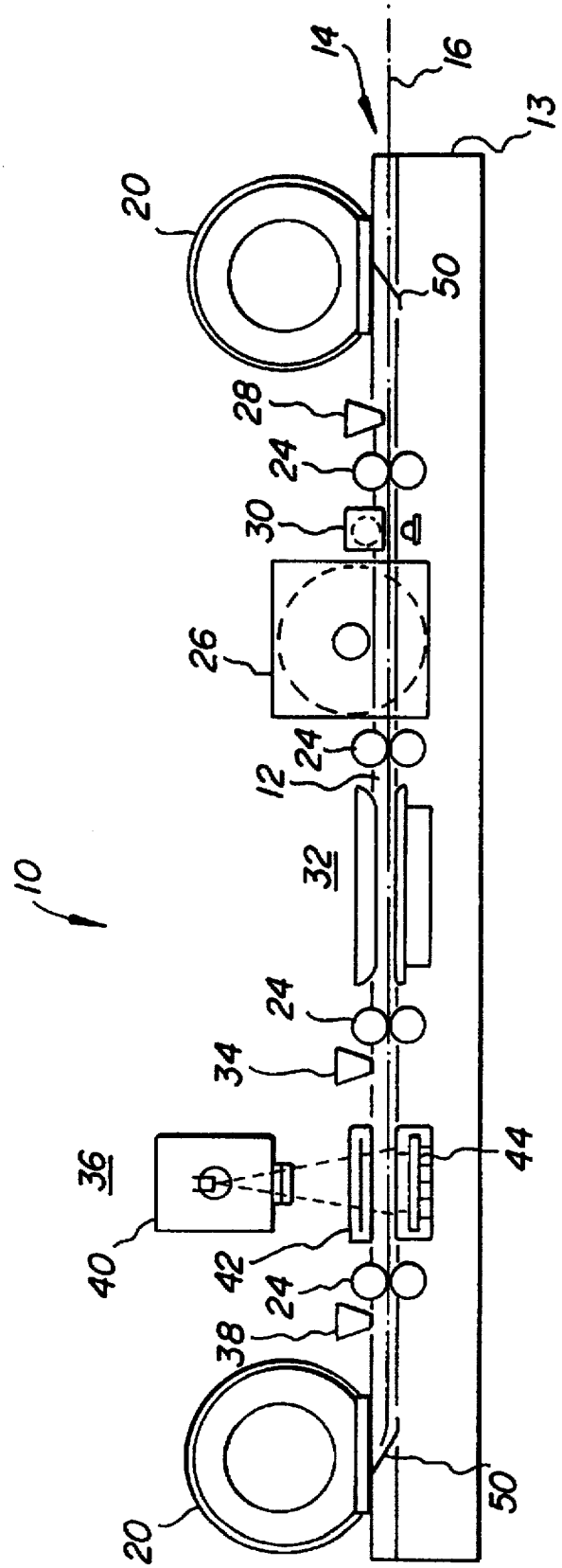
FIG. 1 is a schematic side elevation view of the film handling apparatus of a photographic film scanner printer system illustrating the features of the invention.
Figure 2:
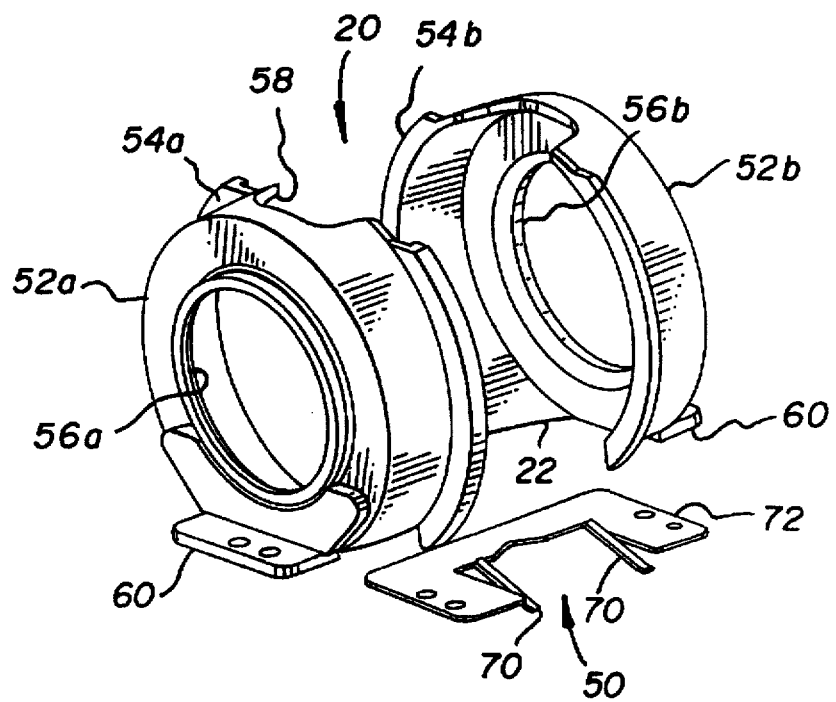
FIG. 2 is an exploded perspective view of a film receiving chamber useful in the present invention.
Figure 3:
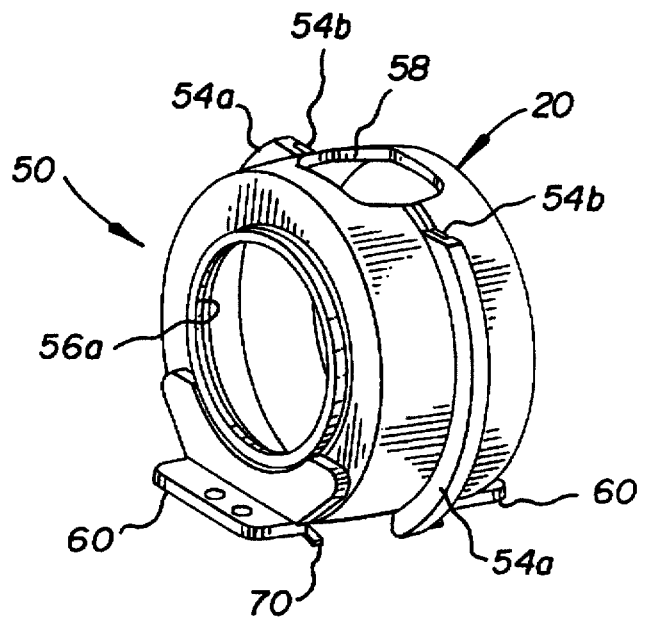
FIG. 3 is a perspective view of the chamber of FIG. 2 in assembled form.
Figure 4:
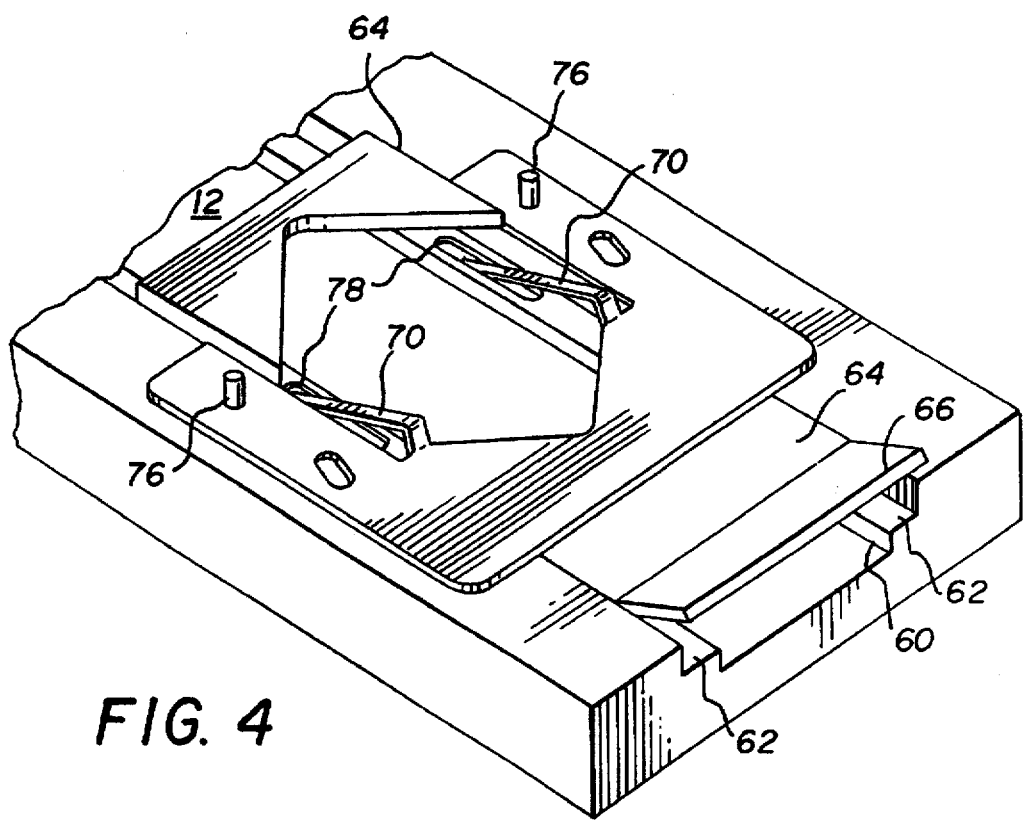
FIG. 4 is a perspective view of a portion of the film handling apparatus of the invention illustration feature of the film track assembly.
Figure 5:
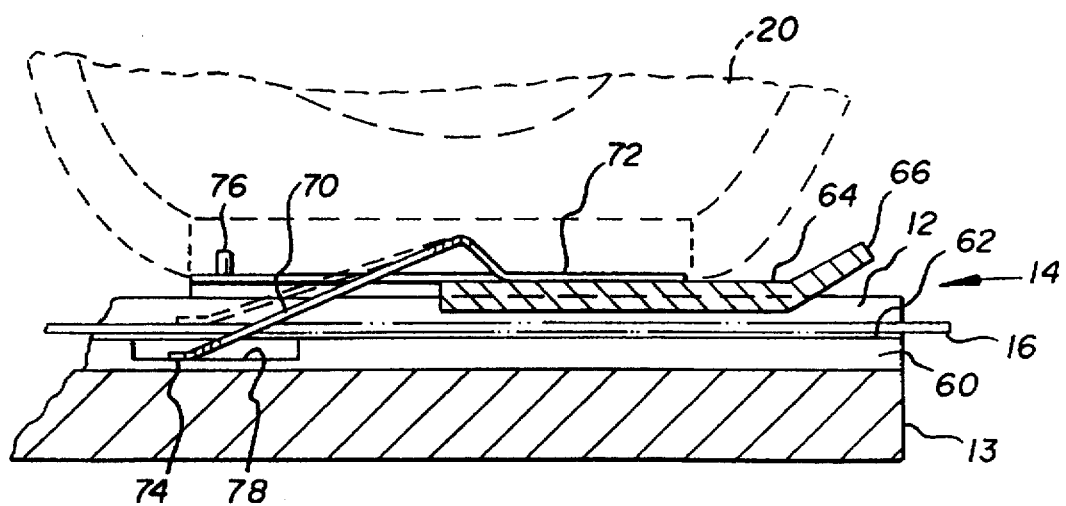
FIG. 5 is a side elevation section of the film track assembly of FIG. 4.

Referring now to FIGS. 1, the illustrated film handling apparatus 10 is provided with an elongated film track 12 formed in a base 13 with an entrance opening 14 at one end to allow insertion of a film strip 16. Doughnut shaped film receiving chambers 20, described in more detail below, are mounted at each end of the film track 12 and are provided with openings 22 (FIG. 2) at the bottom of the chambers in register with the film track to allow entry of the film strip into the chambers where the film is coiled for temporary storage therein. Nip rollers 24 driven by a reversible drive motor 26 engage the inserted film and transport the film in a forward direction (right to left in FIG. 1) past a series of detectors and exposure stations comprising a first film presence detector 28, DX bar code reader 30, film print exposure station 32, perforation detector 34, film image scan exposure station 36 and a second film presence detector 38.

During the transport of the film in the forward direction, the film is advanced coninuously past the film image scan exposure station in which light from a scanner lamp house 40 and shutter 42 assembly is exposed through the film image onto a linear CCD 44 scanner which develops image density data used as inputs to exposure determining algorithms in conventional manner. The data derived during the scanning operation may be stored, frame-by-frame, in a memory (not shown) for later use during the film printing operation. As the film passes out of the scan exposure station 36, it is diverted by diversion means 50 through the opening 22 in the bottom of the left hand film receiving chamber 20 and coiled within the chamber. When all the images on the film strip have been scanned, the drive motor 26 is reversed and the film is tranported in the reverse direction, left to right, back through the detector and exposure stations. Printing of the film images may be performed during this reverse transport phase by intermittantly stopping the film to clamp successive image frames in the print station. Alternatively, the film may be transported in the reverse direction without printing thus allowing ample time to complete exposure determination algorithm processing. When the end of the film strip 16 reaches the right side of the film track 12, it engages diversion means 50 which causes the film to be diverted into the right hand chamber 20 where it is coiled for temporary storage. If printing is performed during this second pass, the film is then removed from the chamber by the system operator and a new film inserted into the track. If printing is deferred until the third pass, drive motor 26 again reverses and transports the film in the forward direction intermittantly through print exposure station 32 for printing, after which the film is accumulated, as before, in the left hand film receiving chamber 20 where it is removed by the system operator.

Referring jointly to FIGS. 2–5, there will now be described the novel film chamber and film diverting mechanism of the film handling apparatus of the present invention. The illustrated chamber 20 is preferably vacuum formed of suitable plastic in two halves 52a, 52b which are bonded together at flanges 54a, 54b. An opening 22 is provided along a bottom chord of the chamber to allow entry of the film as described above. Side openings 56, 56b and top opening 58 are provided to allow ready access by the photofinishing operator to the coiled film in the chamber for removal purposes. Laterally extending feet 60 are provided for mounting of the chamber 13 to the base of the film handling operation.

Film track is formed in base plate 13 with a relieved section 60 in the center to minimize contact of the film image areas with the track. As a result, the edges of the film are in contact only along the raised lands 62. A removable guide plate 64 is seated in recesses formed in base 13 at the entry end of the film track 12 and has an upwardly slanted flange 66 to facilitate insertion of the film strip 16. A pair of downwardly extending cantilevered spring fingers 70, one on each side of the film track, comprises film diversion means for diverting the film into the chamber opening when the film is transported in a direction (left to right in FIG. 5) such as to encounter the upper surface of the spring fingers. Spring fingers 70 are cantilevered from a spring plate 72 which is mounted above the film track between the bottom opening 22 of the film receiving chamber 20 and the track 12. Location pins 76 extend upwardly from the guide plate 64 to aid in positioning of the spring plate 72 and the film chamber 20. The free ends 74 of the spring fingers are biased downwardly and normally rest in recesses formed in the raised side lands of the film track to ensure that the film freely engages the upper surfaces of the spring fingers without interfering with the spring finger ends. The angle that the fingers 70 extend across the film transport path is relatively shallow relative to the film path so as to allow easy insertion of the film into the track in the forward direction which forces the fingers to rise upwards as shown in phantom outline in FIG. 5. Once the end of the film has cleared the springs fingers, the fingers drop downward across the film path with the free ends 74 in recesses 78 to be in position to cause diversion of the film into the receiving chamber 20 when the film transport direction is reversed.

The design of the film receiving chamber and film diversion means assembly is such that it may be used conveniently at both ends of the film track. Obviously, if entry of the film to the track is allowed only in one direction, the spring fingers associated with the receiving chamber at the far end of the track are utilized only for diversion of the film into the chamber.

Figure 6:
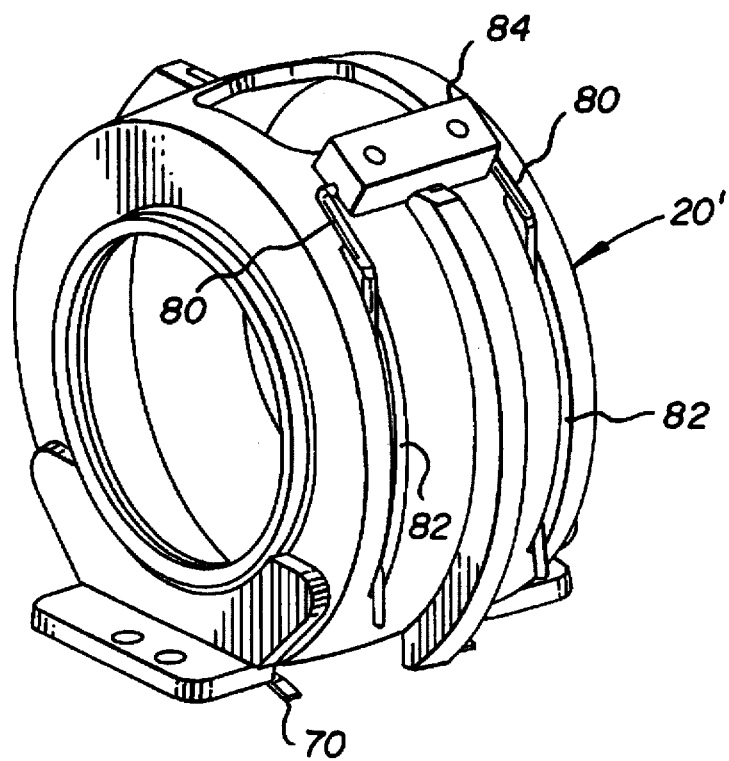
FIG. 6 is a perspective view of a preferred form of the film receiving chamber of the present invention.
Figure 7:
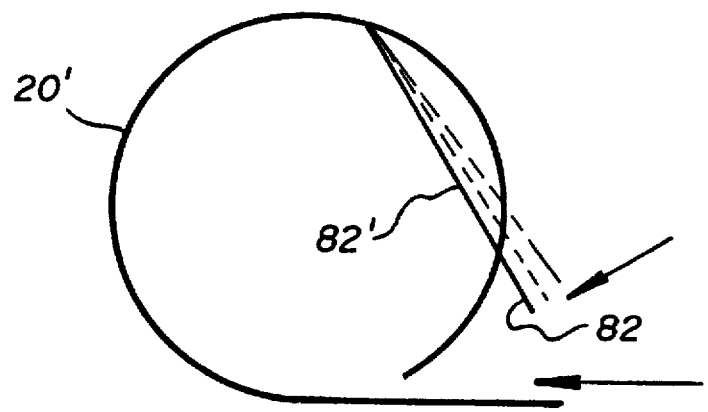
FIG. 7 is a schematic diagram useful in explaining the operation of the chamber of FIG. 6.

Referring to FIGS. 6 and 7, a presently preferred embodiment of the film chamber, designated 20', is shown in which spring wires 80 are mounted by block 84 on the chamber. Slots 82 formed in the circumference of the chamber allow the spring wires to rest within the chamber along a chord line 82'. With this arrangement, when the film enters the chamber and is coiled therewithin, the radius of the coil is initially determined by the radial distance to the chord line 82' created by spring wires 82. As the film continues to scroll into the chamber, the internal radius of the film coil remains substantially constant and the outer diameter of the film coil expands against the flexible spring wires which pivot outwards as shown in FIG. 7. This facilitates the coiling of the film within the chamber and reduces resultant backforce against the film strip as the film is transported along the film track and thrust into the chamber.

The invention has been described with reference to a preferred embodiment. However, it will be appreciated that variations and modifications can be effected by a person of ordinary skill in the art without departing from the scope of the invention.

PARTS LIST
10 film handling apparatus
12 film track
13 base
14 entrance opening
16 film strip
20 film receiving chambers
22 bottom openings
24 nip rollers
26 reversible drive motor
28 first film presence detector
30 DX bar code reader
32 film print exposure station
34 perforation detector
36 film scan exposure station
38 second film presence detector
40 scanner lamp house
42 scanner shutter
44 linear CCD
50 film diversion means
52 chamber halves
54 chamber flanges
56 chamber side openings
58 chamber top opening
60 center relieved area of track
62 edge raised bands of track
64 removable guide plate
66 slanted guide plate flange
70 spring fingers
72 spring plate
74 free ends of spring fingers
76 locator pins
78 recesses

What is claimed is:

1. Film handling apparatus for a multipass photographic film scanner and printer system in which film is transported in forward and reverse directions during separate scanning and printing operations, the apparatus comprising:

a film track for guiding an elongated strip of film along a film transport path past one or more film exposure stations for said scanning and printing operations, the film track having an entry port for insertion of the film into the track in a forward direction;

drive means for transporting the film in forward and reverse directions along the film track;

a first film receiving chamber mounted above the track at the film entry port, the chamber having an opening in communication with the track for receiving and coiling the film for temporary storage therein; and film diversion means extending into the film transport path to engage an end of the film for diverting the film away from the entry port and into the chamber opening when the film is transported in the reverse direction, the diversion means being movable out of the film transport path to allow insertion of the film into the track in the forward direction.

2. The film handling apparatus of claim 1 having a second film receiving chamber having an opening mounted above the track at the end remote from the entry port and having film diversion means extending into the film transport path below the second chamber for diverting the film being transported in the forward direction into the chamber opening for temporary storage therein.

3. The film handling apparatus of claim 1 wherein the diversion means comprises a pair of cantilevered spring fingers, one on each side of the track, extending across the film transport path at an angle that allows insertion of the film into the track in the forward transport direction and diversion of the film into the receiving chamber in the reverse transport direction.

4. The film handling apparatus of claim 3 in which the film track has a pair of recesses, one on each side of the track below the film transport path, and in which the spring fingers have free ends thereof biased downward into the recesses such that the film comes in contact with upper surfaces of the spring fingers during transport of the film in the reverse direction to thereby divert the film into the film receiving chamber.

* * * * *

UNITED STATES PATENT AND TRADEMARK OFFICE
CERTIFICATE OF CORRECTION

PATENT NO.   : 5,684,564
DATED        : November 4, 1997
INVENTOR(S)  : Stephen P. North It is certified that error appears in the above-identified patent and that said Letters Patent is hereby corrected as shown below:

Title page, insert the following:

--[60] Provisional application No. 60/000,773, filed Jun. 30, 1995--

Column 1, line 5, insert the following:

--CROSS REFERENCE TO RELATED APPLICATION_
Reference is made to and priority claimed from U.S. provisional application Ser. No. U.S. 60/000,773, filed Jun. 30, 1995, entitled FILM HANDLING APPARATUS FOR MULTIPASS PHOTOGRAPHIC FILM SCANNER AND PRINTER.--

Signed and Sealed this

Seventeenth Day of February, 1998

*Attest:*

BRUCE LEHMAN

*Attesting Officer*           *Commissioner of Patents and Trademarks*